United States Patent [19]
Blowes et al.

[11] Patent Number: 5,876,606
[45] Date of Patent: Mar. 2, 1999

[54] TREATMENT OF CONTAMINATED WATER

[75] Inventors: David William Blowes; Carol Jane Ptacek; Michael John Baker, all of Waterloo, Canada

[73] Assignee: University of Waterloo, Waterloo, Canada

[21] Appl. No.: 745,734

[22] Filed: Nov. 12, 1996

[30] Foreign Application Priority Data

Nov. 10, 1995 [GB] United Kingdom ............... 9523113

[51] Int. Cl.$^6$ ........................................ C02F 1/28
[52] U.S. Cl. .................. 210/679; 210/170; 210/263; 210/906; 210/908; 210/912; 210/914
[58] Field of Search ................... 210/667, 679, 210/683, 170, 290, 688, 691, 747, 263, 906, 908, 912, 914, 682

[56] References Cited

U.S. PATENT DOCUMENTS 3,772,901  11/1973  Ferraro ................. 210/199
4,184,947  1/1980   Demisch ................ 210/18
4,414,115  11/1983  The ..................... 210/665

FOREIGN PATENT DOCUMENTS

0 619 273  10/1994  European Pat. Off. .

Primary Examiner—Ivars Cintins
Attorney, Agent, or Firm—Anthony Asquith & Co.

[57] ABSTRACT

The metal oxide media includes oxides and hydroxides of iron, and other metals. The material is derived from basic-oxygen steel-making process, and includes a high calcium content. The oxide surfaces facilitate the adsorption of phosphorus, and the increased pH facilitates the precipitation of calcium and other phosphates. The oxides are a catalyst for converting organic phosphorus to inorganic form. Limestone may be added to the oxides, to ensure a long-term source of calcium, and to maintain high pH for long periods.

39 Claims, 5 Drawing Sheets

Phosphorous reactive mixture applied to septic system infiltration bed

● (Fe,Al)atom  ⊘ Oxygen atom

Schematic fo specific absorption of phosphate on hydroxylated mineral surfaces

FIG.1

$\beta Ca_3(PO_4)_2 = 3Ca^{2+} + 2PO_4^{3-}$   $K=10^{-28.94}$

TCP solubility curve as a function of pH using MINTEQA2. Cal levels are controlled by mainaining equilibruim with respect to calcite. (Thermodynamic data from Vieillard and Tardy, 1984)

Phosphorous reactive mixture applied to septic system infiltration bed

FIG.4

Reactive mixture contained within modular unit that treats high quality effluent before final discharge to leachfield

FIG.5

A vertical treatment wall installed to intercept existing phosphate plume

FIG.6

Batch experiment result for a reactive mixture composed of 50 wt% silica sand, 45wt% crushed linestone, and 5wt% metal oxide

FIG.7A

Result of batch experiment using 100 wt% cakcareous aquifer sand

FIG.7B

Theoretical column breakthrough curves for conservative transport, and absorption + precipitation.

FIG.8A

Phosphate breakthrough curve for dynamic column experiment. Average reduction in phosphate concentration of > 85% has been achieved over 3 years of continuous loading

FIG.8B

TREATMENT OF CONTAMINATED WATER

This invention relates to the treatment of water, for example domestic waste water, contaminated with, for example, phosphorus. The phosphorus contaminant may be, for example, organic phosphorus, condensed phosphate, or inorganic orthophosphate.

Other contaminants that may be treated in the manner as described herein are As, Se, Hg, U, Tc, Mo, Sb, and Bi, and also water-borne pathogens, bacteria, and viruses.

BACKGROUND TO THE INVENTION

Conventional systems for treating domestic waste water, including domestic septic systems, have concentrated on oxidising organic carbon, and on completing the nitrification of ammonia to nitrate.

It has largely been left to naturally-occurring processes to remove phosphorus in the waste-water. However, the problem of contamination of lakes etc by phosphorus is troublesome in some cases to the extent that further habitation cannot be allowed around the lake unless steps are taken to reduce the phosphorus contamination.

It is recognised that there is a need for a treatment system for removing phosphorus from waste water, that is effective, does not put other pollutants into the water, is passive (in the sense of needing little input of energy, replenishment materials, and attentive and skilled service). It is recognised that, in order to be acceptable from the regulatory standpoint, the materials the system uses have to be very cheap.

It is an aim of the invention to provide a barrier of a very inexpensive treatment material, in the flow-path of the contaminated water, the barrier being permeable enough to allow the water to pass therethrough, and the treatment material being such as will remove the phosphorus and other contaminants.

It is known to inject liquids such as $FeCl_3$ or $Al_2(SO_4)_3$ into municipal sewage; this causes precipitation of, for instance, $FePO_4$, which collects as sludge. However, as a general rule, treatment by adding a liquid is disadvantageous from the service and maintenance side, in that the liquid cannot be added just once and then left, but must be added regularly. Thus, an add-a-liquid treatment system is contraindicated for the domestic situation. Domestically, a passive system is desirable, which means, at least insofar as the treatment system is to be simple and inexpensive, that the treatment material must be a solid. Also, in a domestic system, by contrast with a municipal system, a treatment mechanism that causes the formation of sludge is contraindicated, because sludge would clog the tile-bed or other soakaway facility. In the domestic situation low cost, and passiveness, are critical.

GENERAL FEATURES OF THE INVENTION

The invention involves passing the contaminated water through a permeable treatment material. In a passive system, it is important that the treatment material be solid, i.e not a liquid, in that a solid material, once emplaced, remains in place, and the water is treated by passing through the stationary solid material.

As will be explained, the treatment material preferably is waste material that is derived from a steel manufacturign process. Such material is available in large quantities, and at zero cost apart from transportation. The treatment material includes metal oxides, for example iron oxide or iron hydroxide—collectively, hydrous iron oxides.

The treatment material preferably is derived from the Basic-Oxygen steel manufacturing process. That process is carried out at a high pH—in some cases at, for example, 10–12 pH—which is provided by the presence of an excess of lime. The slag and other solid residue materials derived from the Basic-Oxygen process are rich in calcium oxides and hydroxides—collectively, hydrous calcium oxides—and are of high pH.

It is recognised that the presence of the hydrous calcium oxides and the high alkalinity in the metal oxide treatment material is advantageous in the treatment of water contaminated with phosphorus.

There are a number of mechanisms whereby the concentration of phosphorus dissolved in water may be lowered. First, by adsorption of phosphate onto a metal oxide surface; second, by precipitation of a metal phosphate onto the oxide surface; and third, by precipitation of calcium phosphates.

These three mechanisms are explained in more detail below. The concentration of the phosphorus in water is lowered by converting the dissolved phosphorus into a solid form, and it is noted that the three mechanisms are such that the process of conversion of the dissolved phosphorus into a solid form is increased at higher pH.

In waste water, phosphorus is also often present in organic form. It is noted that hydrous metal oxides can serve as a catalyst, to aid in the rapid splitting of the organic form; after that, the concentration of the inorganic phosphorus may be reduced by the three mechanisms as described.

THE DRAWINGS

The invention will now be further described with reference to the accompanying drawings, in which.

In the first mechanism, phosphate is adsorbed onto the basic metal oxide surface. The chemical binding of aqueous phosphate anions to these surfaces takes place by a process that results in stable covalently-bonded surface complexes. Phosphate adsorption depends on pH, but in fact adsorption onto hydroxylated mineral surfaces takes place over a broad pH range (when compared with, for example, pure electrostatic adsorption). Iron and aluminum hydroxides are advantageous in phosphate adsorption as they are known to form hydroxylated surfaces.

Figure 1:
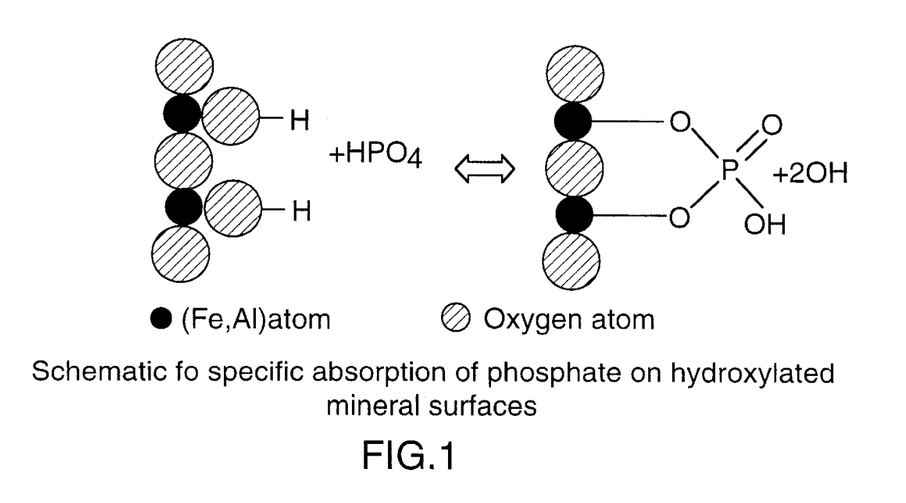
FIG. 1 is a diagram of molecules participating in an adsorption reaction.

FIG. 1 shows a model of the manner in which the stable surface complexes are formed. The equation representing a typical adsorption onto the hydroxylated metal-oxide surface may be expressed as:

where Me is the metal, such as Fe, Al, Mn, etc.

Figure 2A:
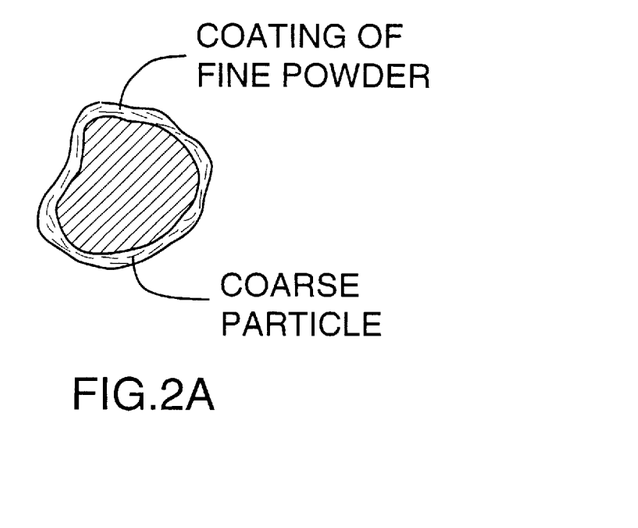
FIGS. 2a and 2b are diagrams of coated particles receiving phosphorus precipitates.
Figure 2B:
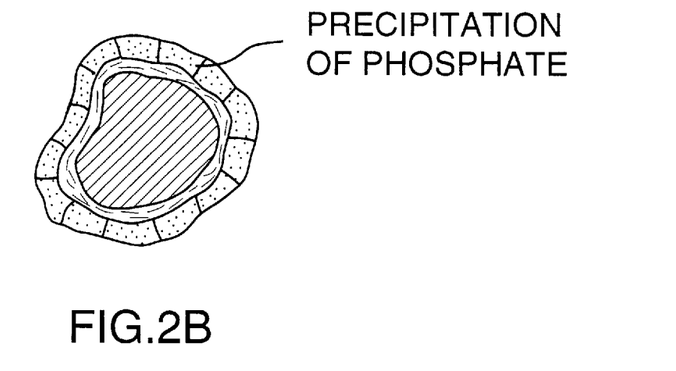

In the second mechanism, a metal phosphate is precipitated onto the oxide surface. FIGS. 2a and 2b illustrate the physical nature of the precipitation. In FIG. 2a, a grain of sand, or other relatively-large particle, has a coating comprising powder-fine particles of metal oxide, for example, iron oxide. When the iron oxide is derived from the Basic Oxygen process, the iron oxide is likely to be, or to include, the ferric forms of the oxide. A typical precipitation reaction may be expressed as:

$$Fe^{3+} + H_2PO_4^- + 2H_2O \rightarrow FePO_4.2H_2O$$

This solid Fe-phosphate precipitates around the coated sand-grain, as shown in FIG. 2b.

Figure 3:
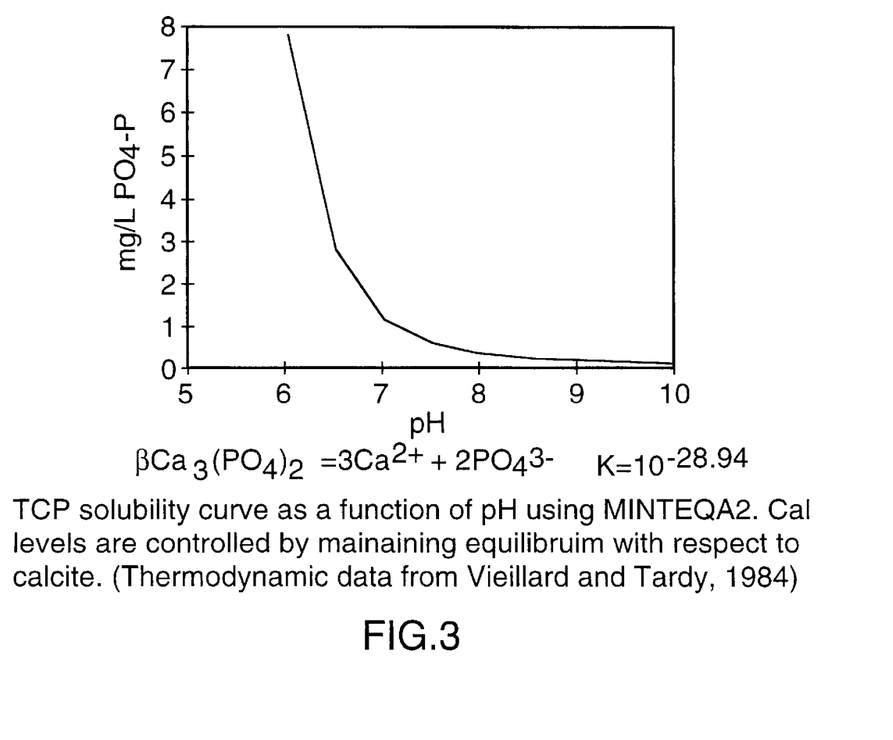
FIG. 3 is a graph showing the solubility of a calcium phosphate phase.

In the third mechanism, calcium phosphates are precipitated. At a pH of 6.5, calcium phosphates may be in solution at around 3 mg/liter, and the solubility increases rapidly as the pH becomes acidic. As shown in FIG. 3, the calcium phosphates become sparingly soluble (i.e become more or less insoluble), and precipitate as the pH gets above about 8.

In deriving the FIG. 3 graph, the phase of the phosphate is tricalciumphosphate (TCP). Other calcium phosphates, for example crystalline hydroxyapatite, may be even less soluble, but the precipitation sequence is not predictable, especially over the short term. Basically, however, the point to be noted is that at alkaline pH's the calcium phosphate phases are solid, whereby phosphorus is removed from solution.

As mentioned, domestic waste-water might contain a significant proportion of organic phosphorus molecules, which cannot participate directly in the inorganic reactions described above. Oxidation and hydrolysis reactions may break the P-bond, and convert the organic molecule to the more stable orthophosphate.

The rates of such reactions are rather slow. However, when the reactions take place around grains coated with a metal oxide, the metal oxide acts as a catalyst, and increases the rate at which organic phosphorus is hydrolysed to orthophosphate. It has been found that the residence time needed to convert the organic phosphate to inorganic forms is reduced so much that the conversion can be completed within the same time frame as that needed to complete the inorganic reactions described above.

In the conversion, the carbon-phosphate molecule is attracted to the metal oxide surface, but the metal oxide causes a preference for a carbon-hydroxide form. The effect is that the $PO_4$ base of the organic molecule is replaced by the stronger hydroxide base; thus the carbon-hydroxide form is the one that is attracted to the metal oxide surface, releasing the phosphate ions. Being now in inorganic form, the phosphate can go on to be adsorbed and precipitated as previously described.

The conversion reaction of a typical organic phosphate molecule may be expressed as:

$$NO_2C_6H_4OPO_3H^- + H_2O + MeO \rightarrow NO_2C_6H_4OH + H_2PO_4^- + MeO$$

The ortho-phosphate $H_2PO_4^-$ is then available to be taken out of solution by the three mechanisms as previously described.

The use of the treatment material as described herein is effective to combine the various treatment mechanisms, and especially to combine adsorption and precipitation, whereby a variety of forms of the contaminants are addressed. As a result, the overall concentration of dissolved phosphorus may be rapidly reduced to a minimum, in a simple, cheap, and passive manner.

The reactive material, as derived from the Basic-Oxygen steel making process will now be described.

The reactive material as used in the reactions described above may be derived from two stages of the process, namely the slag from the furnace and the residue from the fume-scrubbers. The Stelco Hilton Works steel foundry, at Burlington, Ontario, Canada, produces slag and scrubber residue of particularly high pH, due to the excess of lime. The slag may be provided in the form of comparatively large grains or particles, being large in that at least fifty percent of the particles have an overall dimension per particle of between 0.5 mm and 5 mm, and the scrubber residue may be in the form of a fine powder, being fine in that eighty percent of the oxide comprises particles having a dimensions of less than 25 micrometers.

Both forms may be used to promote the reactions that lower the phosphorus concentration.

The metal oxide contains a number of distinct phases, the most important of which, for the purpose of waste-water treatment, are iron (22–52%), CaO (14–37%), MnO (3–6%), and $Al_2O_3$ (0.3–1.5%). It may be noted that, physically, the particles are composites, in that the various oxide phases are integrated with each other in the particles. It is proposed that it is this intimate physical proximity of the different oxides that is responsible for the efficacy of the treatment material at removing the phosphorus from solution by the various mechanisms. By contrast, if separate particles of the various oxides were provided, and mixed together, or layered, the overall efficacy would be reduced.

Particularly important is the fact that the hydrous iron oxides and the hydrous calcium oxides are in intimate proximity, in the particles.

It is also to be noted that the higher temperatures, and the sub-oxic environment, at which the steel-making process is conducted gives rise to the slag and residues being in a rather less oxidised form, which is important in maintaining the stability of the oxides in wastewater conditions.

When the powder form is used, it is important (mainly from the permeability standpoint) to also provide larger particles, whereby the powder may form a coating around the larger particles.

It is preferred to mix grains or particles of limestone $CaCO_3 + MgCO_3$ with the metal oxide particles. The purpose of including the limestone is to provide an excess of calcium, and to raise the pH, over a long period of time. Sand grains may also be provided as an inert bulk material.

It is recognised that waste-water at the common dissolved-phosphorus contamination levels (eg 20 mg of phosphorus per liter of water), and moving at typical velocities through the treatment material, can readily be provided with sufficient residence time to complete the lowering of the phosphorus concentration down to acceptable-release-levels, by the use of the treatment systems as described herein, and the treatment system can be expected to remain effective for periods of at least several years. Many jurisdictions permit water to be released if the phosphorus content is less than 0.3 mg-P/liter.

When the fine powder form of the oxide particles is used, the composition may be (by weight):

5–20% oxide; 20–30% limestone; 60–80% coarse sand.

In these proportions, the powder coats the larger particles (by electrostatic attraction), and the amount of free powder, which would clog up the interstices between the coarse particles, is minimal. Although the oxide proportion is numerically low, by coating the larger particles the effective exposed area of the oxide is high.

When the coarse aggregate form of the oxide powder is used, now the permeability is not a problem, but the effective surface area is reduced, and the preferred composition therefore should rather be:

20–30% oxide; 20% limestone; 60% coarse sand.

The manner in which the contaminated water is passed through the treatment material depends on the location of the contaminated water, the nature of the ground, etc. Various implementations will now be described.

Figure 4:
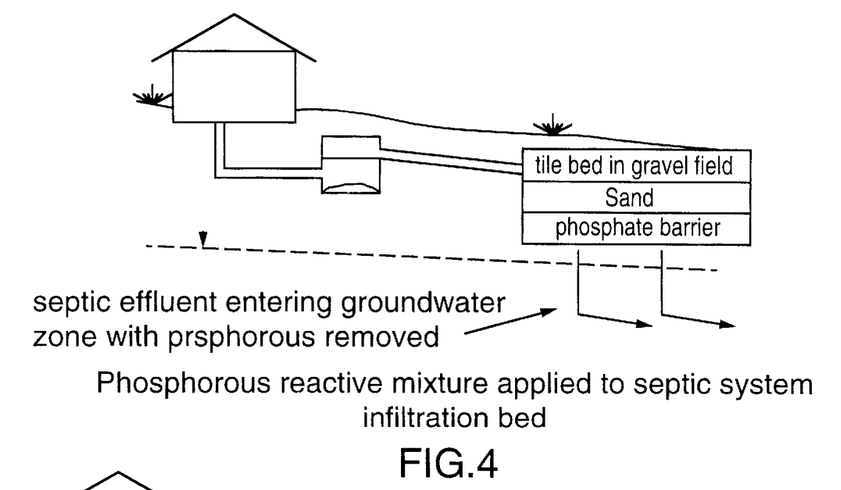
FIG. 4 is a diagram of a water treatment system.

In FIG. 4, waste water from a house is passed through a conventional septic tank 30, and from there is passed to a tile-bed 32, where the aerobic bacterial reactions are completed. From there, in a conventional system, the treated water drains down and is dissipated into the ground. If the water contains phosphorus, however, the phosphorus is largely not removed by this treatment. The phosphorus may be removed by causing the treated water to pass through a permeable layer 34 of treatment material of the type as described herein.

In such a system as is shown in FIG. 4, of course the layer 34 is inaccessible, and cannot practically be replenished or replaced. In this case, the benefits of adding extra limestone into the layer, to maintain the high pH over long periods, are of importance. Maintenance of permeability in the layer over long periods also is important; and the designer should relate the inclusion of coarse sand or other aggregate in the layer to the permeability of the surrounding ground. Of course the layer 34 of treatment material has to be put in place as an operation during the preparation and installation of the tile bed.

Figure 5:
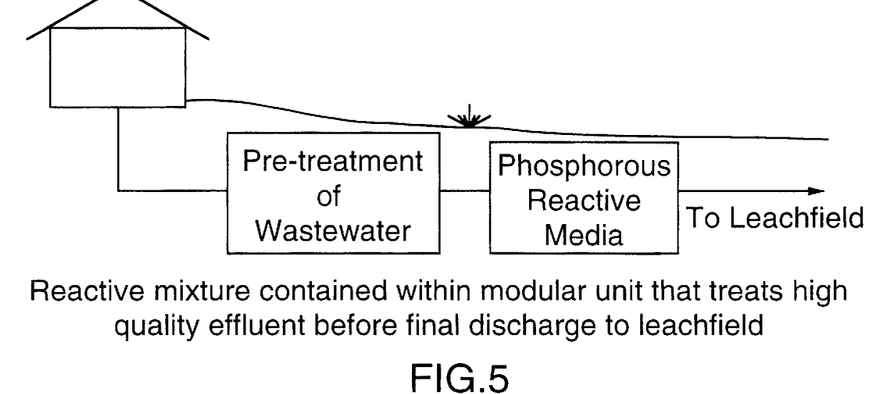
FIG. 5 is a diagram of another water treatment system.

In FIG. 5, an in-line system comprising a modular unit is used to treat domestic waste-water before final discharge to the infiltration bed. This arrangement is suited to water treatment systems that produce a high quality effluent from recirculating sand filters, biofilters, aerobic treatment systems, and the like.

A benefit of the FIG. 5 arrangement is that the reactive media (i.e the treatment material) is readily accessible for possible replacement, if required.

Figure 6:
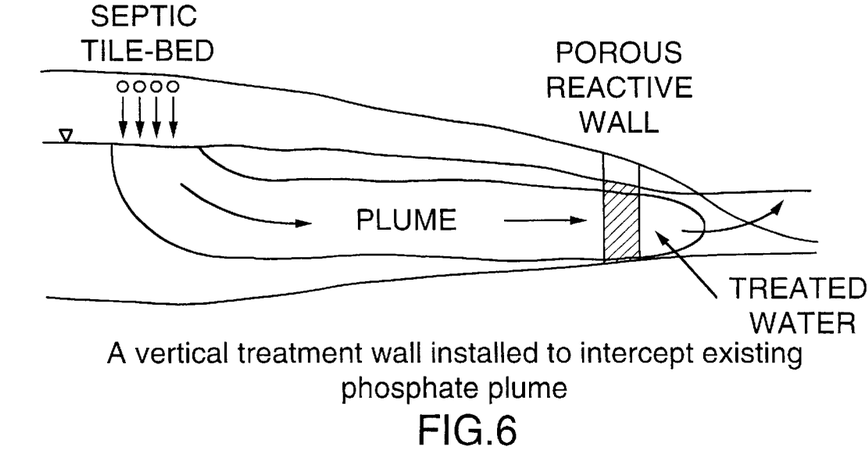
FIG. 6 is a diagram of a further treatment system.

In FIG. 6, a vertical treatment wall is placed in an excavated trench, in the path of an already-existing plume of phosphorus in moving groundwater. A key benefit here is that the in-ground water may be treated in-ground, through simply undergoing its natural flow in the aquifer.

Some of the laboratory experiments performed in evaluating the invention may be summarised as follows.

Experimental materials were incorporated into a series of short-term batch tests. Batch tests provide an effective means to quickly evaluate materials for phosphorous removal. A proposed phosphorous reactive mixture containing 50 wt. % silica sand, 45 wt % crushed limestone and 5 wt % metal oxide was tested. The experiment was repeated using several different types of readily available metal oxides. To assess the relative contribution of the individual components on the overall performance of the reactive mixture, separate batch tests were conducted using silica sand and limestone only. For comparison, the same batch test was performed using 100% calcareous sand from an unconfined aquifer in Southern Ontario.

50 g of dry material was placed in a 500 ml Erlenmeyer glass flask. 500 g of stock phosphate solution (approximately 10 mg/L $PO_4$ phosphorus as $KH_2PO_4$) was added to the reaction flask. The flasks were sealed and agitated on an orbital shaker. The concentration of phosphate within the flask was monitored over time by filtering samples through a 0.45 um syringe filter and analysing for phosphate using the ascorbic acid colourimetric technique. Throughout the batch experiments, it was assumed that any decrease in phosphate concentration within the flask was due only to adsorption and/or precipitation reactions between aqueous $PO_4$ and the experimental mixtures.

The mixture showing the greatest potential from the batch tests was incorporated into a long term column experiment. Column experiments are one of the few methods that can adequately test the response of materials under representative conditions of saturated dynamic flow and cumulative phosphate loading. A bench-scale column was constructed from acrylic plastic (20 cm long and 6.35 cm diameter) and a phosphate solution (3.3 mg/L $PO_4$ phosphorus as $KH_2PO_4$) was administered through Teflon tubing connected to a multi-channel variable speed peristaltic pump. The column received continued input of this solution at representative groundwater velocities, over a period of 3 years (1400 pore volumes). Flow rates, pH, and effluent chemistry were then monitored over time.

Figure 7A:
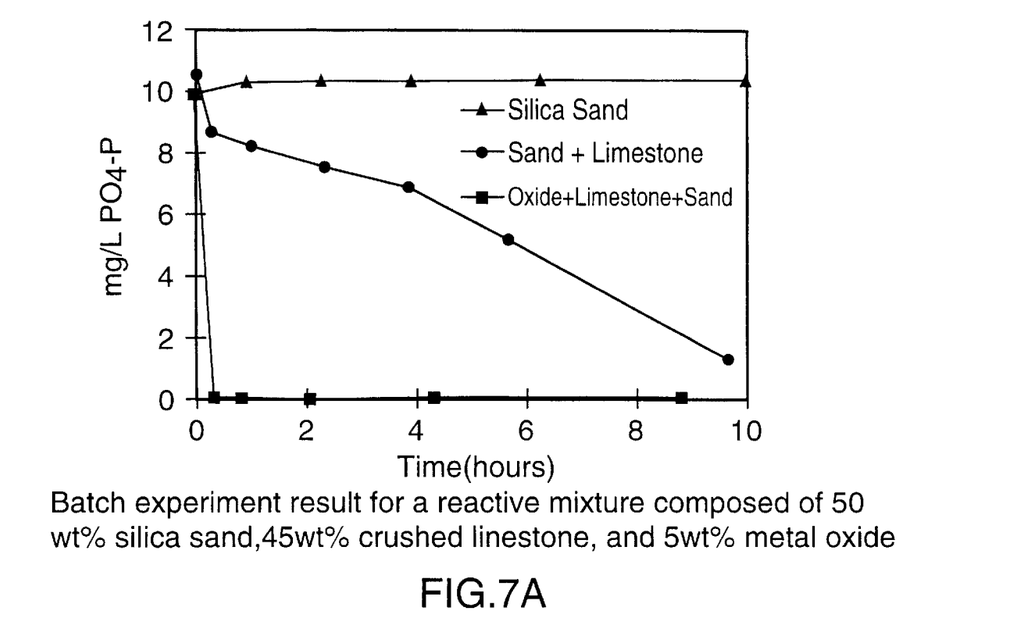
FIGS. 7a and 7b are graphs of the results of a batch experiment.
Figure 7B:
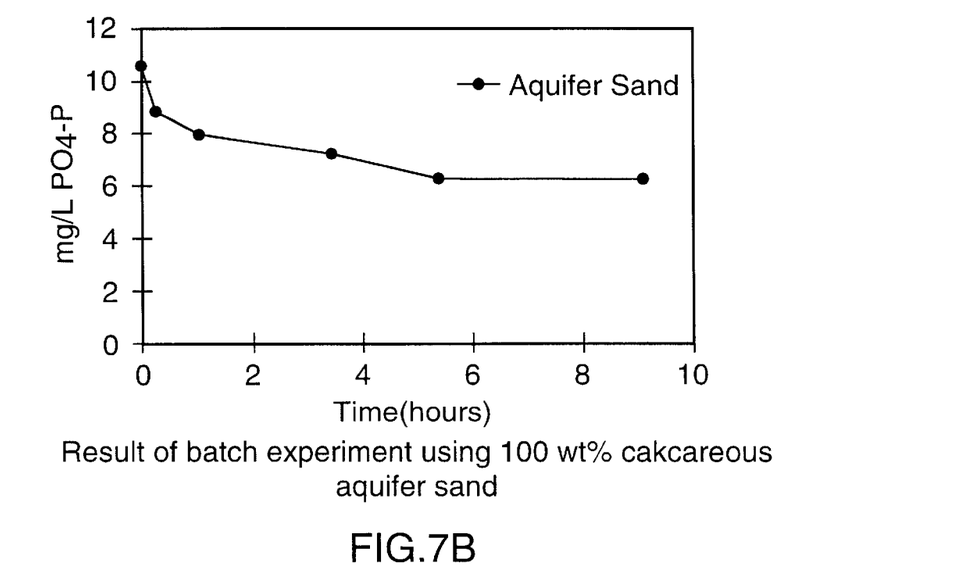

The results of the batch experiments indicated a significant variability of different metal oxides to adsorb phosphate. The most promising mixture (FIG. 7a) was able to remove more than 99% of the initial concentration within a 1.0 hour reaction time. Silica sand did not contribute to the overall treatment; however, crushed limestone displayed significant removal capacity, removing 88% of the phosphate over a period of 10 hours. In comparison, 100 wt % calcareous aquifer sand, removed a maximum of 40% of the initial concentration over 10 hours (FIG. 7b).

Figure 8A:
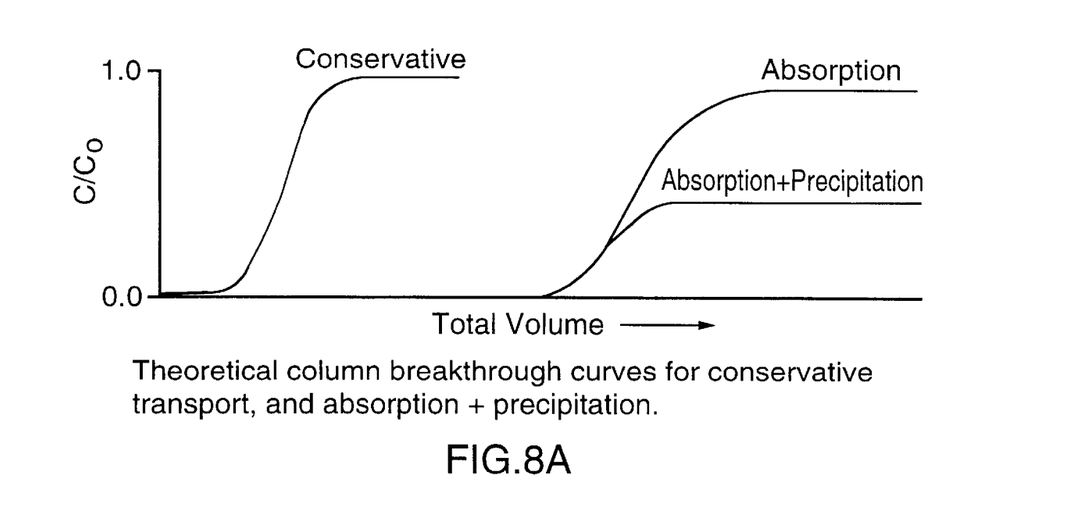
FIGS. 8a and 8b are graphs of the results of long-term column experiments.
Figure 8B:
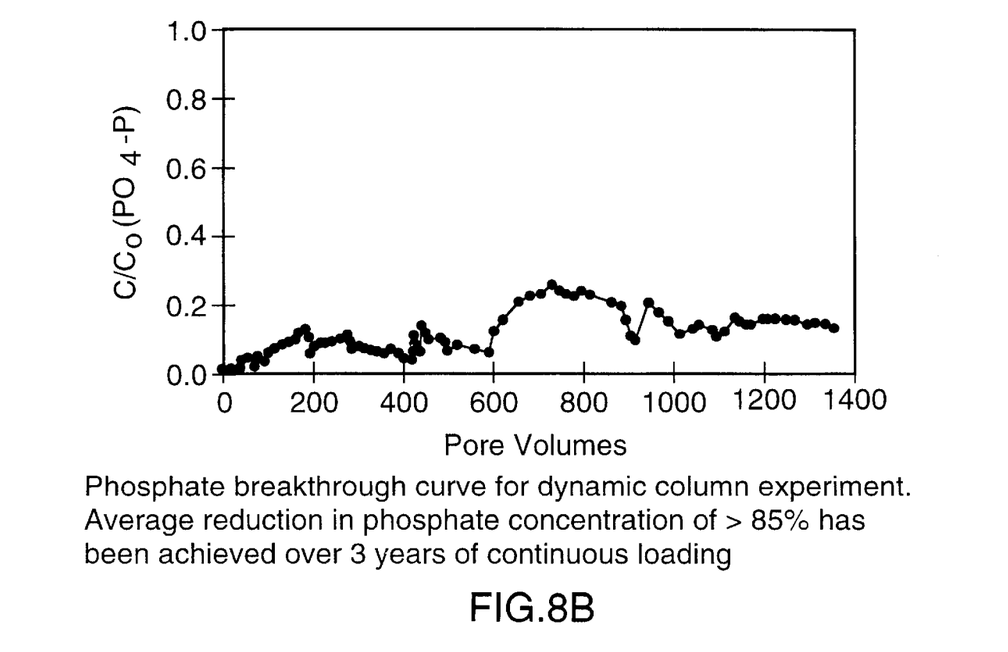

Theoretical breakthrough curves for conservative, adsorbed, and precipitated species, are shown in FIG. 8a. The phosphate breakthrough curve for the long-term column experiment is shown in FIG. 8b. Over the first 65 pore volumes, phosphate concentrations in the effluent remained below detection. Over the remaining time, the concentrations increased slightly, but remained at a relatively constant level. This column averaged more than 85% phosphate removal efficiency throughout the experiment. The shape of the breakthrough curve suggests that both adsorption and precipitation reactions are responsible for the observed reduction in phosphate.

Geochemical speciation modelling using MINTEQA2 indicate that the column effluent is saturated with respect to hydroxyapatite and is at or near saturation with respect to TCP.

Some of the numerical limitations of the preferred forms of the invention will now be described.

The treatment material in the treatment bed includes particles of metal oxides, and the weight of the particles of metal oxides includes a weight of particles of calcium oxides and iron oxides, being a fraction of the total weight of the particles of metal oxides. The particles of calcium oxides and iron oxides are mixed into the body of the treatment material, and are added as a dispersed mixture through the body of treatment material. The weight Wmetox of metal oxides includes, on a mass analysis, a weight WCa of calcium, and includes a weight WFe of iron. The weight WCa is at least five percent of the weight Wmetox, and the weight WFe is at least fifteen percent of the weight Wmetox.

Preferably, the weight WFe of iron includes iron in ferrous and ferric forms, the weight of the ferrous component of which is at least twenty-five percent of the weight WFe.

Preferably also, at least ten percent of the weight WCa of calcium consists of calcium in the form of lime (CaO and $Ca(OH)_2$). Below this level, the effect of the calcium oxides, as described herein, would not be significant, at least in terms of providing treatment over the long term. The weight WCa of calcium may also include calcium in a calcium silicate phase.

As mentioned, the fine particles should be limited to that amount of material that will coat the large particles, but will not clog up the treatment media. Thus the weight of the fine particles should comprise less than twenty percent of the total weight of the treatment material.

Ferric iron should be present in the oxide media, especially for the breakdown of the organic molecules, and because the ferric oxides are also good adsorbers. At least one percent of the weight of iron should be ferric iron, and preferably the weight of the ferric component should be at least ten percent of the weight of iron. The ferric iron form may be haematite $Fe_2O_3$, or magnetite $Fe_3O_4$.

The iron content in the oxide media should be high, in that preferably the weight of the iron in the fine particles is more than forty percent of the weight of the fine particles.

Preferably, the treatment media should include coarse particles of limestone, and preferably the limestone comprises a weight of calcium, in the form of calcium carbonate $CaCO_3$, of at least five percent of the weight of the treatment material. The limestone should be in the form of particles of such size as substantially not to clog up the body of treatment material.

In the case where the oxides are in the form of large, coarse particles (of slag), preferably the weight of the oxides is at least twenty-five percent of the total weight of the treatment material.

Preferably, the slag is rich in calcium, for example in the form of calcium hydroxide $Ca(OH)_2$, to the extent that the weight of the calcium in the slag is at least fifteen percent of the weight of the slag.

We claim:

1. Apparatus for treating contaminated water, wherein:
   the apparatus includes a treatment bed comprising a permeable body of particles of treatment material;
   the apparatus includes a means for passing the contaminated water through the treatment bed;
   the treatment material is material which, when the contaminated water is passed therethrough, causes a reduction in the concentration of the contaminants in water emerging from the treatment material;
   the permeability of the treatment material is such that, when the contaminated water is passed therethrough, the material provides a velocity of through-passage of the water such that a residence time of the contaminants in the treatment material is enough to reduce the concentration of the contaminants down to a predetermined release standard;
   the treatment material in the treatment bed includes particles of metal oxides, and the particles of metal oxides have a weight of Wmetox weight units, the weight Wmetox being a fraction of the total weight Wtremat of the treatment material;
   the weight Wmetox of the particles of metal oxides includes a weight WCaFeOx of particles of calcium oxide and iron oxide, the weight WCaFeOx being a fraction of the total weight Wmetox of the particles of metal oxides;
   the particles of calcium oxide and iron oxide are composite integrated particles, in that the oxide phases are physically integrated with each other in the particles;
   the body of treatment material includes the integrated particles of calcium oxide and iron oxide;
   the integrated particles are included as a dispersed mixture through the body of treatment material;
   the weight WCaFeOx of calcium oxide and iron oxide includes, on a mass analysis, a weight WCa of calcium, and includes a weight WFe of iron;
   the weight WCa is at least five percent of the weight Wmetox, and the weight WFe is at least fifteen percent of the weight Wmetox.

2. Apparatus of claim 1, wherein the weight WFe of iron includes a weight Wferrous of iron in ferrous iron form, and the weight Wferrous is at least twenty-five percent of the weight WFe.

3. Apparatus of claim 1, wherein at least ten percent of the weight WCa of calcium consists of calcium in the form of lime, CaO and $Ca(OH)_2$.

4. Apparatus of claim 1, wherein the total weight Wtremat of the treatment material includes a weight Wcoarse of coarse particles, being coarse in that at least fifty percent of the weight Wcoarse comprises particles of between half a milli-meter and five milli-meters.

5. Apparatus of claim 4, wherein the calcium oxide and iron oxide are in the form of fine particles, being fine in that a weight Wfine thereof, being at least eighty percent of the weight Wmetox of the metal oxides, comprises particles of less than twenty-five micro-meters.

6. Apparatus of claim 5, wherein the weight Wfine of the fine particles of the calcium oxide and iron oxide is large enough to provide the coarse particles with a substantial coating by the fine particles, and yet the weight Wfine comprises less than twenty percent of the total weight Wtremat of the treatment material, whereby the fine particles do not clog up the interstices between the coarse particles.

7. Apparatus of claim 5, wherein the weight WfineFe of the iron in the fine particles of the calcium oxide and iron oxide includes, on a mass analysis, a weight Wferric of iron in ferric iron form, and the weight Wferric is at least one percent of the said weight WfineFe of iron.

8. Apparatus of claim 7, wherein the weight Wferric is at least ten percent of the said weight WfineFe of iron.

9. Apparatus of claim 7, wherein the ferric iron form is haematite $Fe_2O_3$.

10. Apparatus of claim 7, wherein the ferric iron is magnetite $Fe_3O_4$.

11. Apparatus of claim 5, wherein the weight WfineFe of the iron in the fine particles of the calcium oxide and iron oxide is more than forty percent of the weight Wfine of the fine particles.

12. Apparatus of claim 11, wherein the coarse particles are particles of sand or other material that is chemically inert in relation to the metal oxides.

13. Apparatus of claim 5, wherein the coarse particles are particles of a solid material other than the said calcium oxide and iron oxide.

14. Apparatus of claim 5, wherein:
   some of the coarse particles are particles of limestone;
   the total weight Wtremat of treatment material includes, on a mass analysis, a weight Wlimestone of calcium, in the form of calcium carbonate $CaCO_3$,
   and Wlimestone is at least five percent of Wtremat.

15. Apparatus of claim 4, wherein the coarse particles are particles of the metal oxides, including the calcium oxide and iron oxide.

16. Apparatus of claim 15, wherein the coarse particles are particles of basic-oxygen-furnace slag, and the weight Wslag of the slag is at least twenty-five percent of the total weight Wtremat of the treatment material.

17. Apparatus of claim 16, wherein the weight Wslag of the slag includes, on a mass analysis, a weight WslagCa of calcium in the form of calcium hydroxide $Ca(OH)_2$, and the weight WslagCa is at least fifteen percent of Wslag.

18. Apparatus of claim 16, wherein substantially all the rest of the total weight Wtremat is sand.

19. Apparatus of claim 16, wherein substantially all the rest of the total weight Wtremat is a mixture of sand and limestone.

20. Apparatus of claim 1, wherein the treatment material includes a weight Wlimestone of limestone, the weight Wlimestone being at least five percent of the total weight Wtremat of the treatment material, and the limestone is in the form of particles of such size as substantially not to clog up the body of treatment material.

21. Apparatus of claim 1, wherein the treatment material is a substantially homogeneous non-layered mixture of the particles of calcium oxide and iron oxide, with other metal oxides, sand, and limestone.

22. Apparatus of claim 1, wherein the particles are themselves composites of the calcium oxide and iron oxide and other metal oxides.

23. Apparatus of claim 1, wherein:
the contaminated water is groundwater in its native aquifer, and the groundwater contains a plume of the contaminant, moving through the aquifer;
the apparatus includes a trench excavated in the aquifer material;
the permeable body of solid particles of treatment material is located in the trench;
the trench and the said body are so located in relation to the plume that the plume, in moving through the aquifer, passes through the body of material in the trench.

24. Apparatus of claim 1, wherein the contaminated water is water moving predominantly vertically down into the ground;
the permeable body of solid particles of treatment material is disposed in the ground as a horizontal layer;
the layer is so disposed in the ground that the contaminated water, in moving down through the ground, passes through the body of material in the horizontal layer.

25. Apparatus of claim 24, wherein the apparatus is a component of a septic-treatment system, which includes a septic tank and an aerobic water treatment structure, and the horizontal layer is disposed underneath the aerobic water treatment structure.

26. Apparatus of claim 1, wherein the apparatus includes a container and the apparatus includes a means for passing the contaminated water into and through the container;
the permeable body of solid particles of treatment material is so located inside the container that the contaminated water, in passing through the container, passes through the body of material in the container.

27. Apparatus of claim 1, in combination with a body of the contaminated water, wherein the contaminant in the water is phosphorus.

28. Apparatus of claim 27, wherein the contaminant in the water is organic phosphorus.

29. Apparatus of claim 27, wherein the contaminant in the water is condensed phosphate.

30. Apparatus of claim 27, wherein the contaminant in the water is inorganic orthophosphate.

31. Apparatus of claim 1, in combination with a body of the contaminated water, wherein the contaminants in the water are pathogens.

32. Apparatus of claim 1, in combination with a body of the contaminated water, wherein the contaminants in the water are bacteria.

33. Apparatus of claim 1, in combination with a body of the contaminated water, wherein the contaminants in the water are viruses.

34. Apparatus of claim 1, in combination with a body of the contaminated water, wherein the contaminant comprises an element selected from the group consisting of As, Se, Hg, U, To, Mo, Sb, and Bi.

35. Apparatus of claim 1, wherein each of the integrated particles is a solid composite of hydrous iron oxide and hydrous calcium oxide.

36. Apparatus of claim 1, wherein the metal oxides are in the form of a fine powder, and the treatment material comprises 5–20% oxides, 20–30% limestone, and 60–80% coarse sand.

37. Apparatus of claim 1, wherein the metal oxides are in the form of a coarse aggregate, and the treatment material comprises 20–30% oxides, 15–25% limestone, and 55–65% coarse sand.

38. Apparatus of claim 1, wherein the metal oxides comprise 22–52% iron, 14–37% CaO, 3–6% MnO, and 0.3–1.5% $Al_2O_3$.

39. Procedure for treating contaminated water, wherein:
the procedure includes the step of providing a treatment bed comprising a permeable body of solid particles of treatment material;
the procedure includes the step of passing the contaminated water through the treatment bed;
the treatment material is material which, when the contaminated water is passed therethrough, causes a reduction in the concentration of the contaminants in water emerging from the treatment material;
the permeability of the treatment material is such that, when the contaminated water is passed therethrough, the material provides a velocity of through-passage of the water such that a residence time of the contaminants in the treatment material is enough to reduce the concentration of the contaminants down to a predetermined release standard;
the treatment material in the treatment bed includes particles of metal oxides, and the particles of metal oxides have a weight of Wmetox weight units, the weight Wmetox being a fraction of the total weight Wtremat of the treatment material;
the weight Wmetox of the particles of metal oxides includes a weight WCaFeOx of particles of calcium oxide and iron oxide, the weight WCaFeOx being a fraction of the total weight Wmetox of the particles of metal oxides;
the particles of calcium oxide and iron oxide are composite integrated particles, in that the oxide phases are physically integrated with each other in the particles;
the body of treatment material includes the integrated particles of calcium oxide and iron oxide;
the integrated particles are included as a dispersed mixture through the body of treatment material;
the weight WCaFeOx of calcium oxide and iron oxide includes, on a mass analysis, a weight WCa of calcium, and includes a weight WFe of iron;
the weight WCa is at least five percent of the weight Wmetox, and the weight WFe is at least fifteen percent of the weight Wmetox.

* * * * *